(12) United States Patent
Steeby

(10) Patent No.: US 8,442,732 B1
(45) Date of Patent: May 14, 2013

(54) METHOD AND SYSTEM FOR DETERMINING A DRIVELINE RATIO FOR A POWERTRAIN HAVING AN AUXILIARY TRANSMISSION

(75) Inventor: Jon A. Steeby, Schoolcraft, MI (US)

(73) Assignee: Eaton Corporation, Cleveland, OH (US)

( * ) Notice: Subject to any disclaimer, the term of this patent is extended or adjusted under 35 U.S.C. 154(b) by 67 days.

(21) Appl. No.: 13/283,038

(22) Filed: Oct. 27, 2011

(51) Int. Cl.
*G06F 19/00* (2011.01)

(52) U.S. Cl.
USPC .......................................... 701/54; 477/110

(58) Field of Classification Search ............ 701/36, 701/51, 53, 54, 58, 61; 477/34, 68, 107, 477/110
See application file for complete search history.

(56) References Cited

U.S. PATENT DOCUMENTS

| | | | |
|---|---|---|---|
| 3,675,508 A | 7/1972 | Blank | |
| 5,679,096 A * | 10/1997 | Stine et al. | 477/111 |
| 5,738,606 A * | 4/1998 | Bellinger | 477/111 |
| 5,797,110 A | 8/1998 | Braun et al. | |
| 5,951,614 A | 9/1999 | Tabata et al. | |
| 6,080,082 A | 6/2000 | Steeby | |
| 6,185,494 B1 | 2/2001 | Wadas | |
| 6,186,925 B1 * | 2/2001 | Bellinger | 477/175 |
| RE37,703 E * | 5/2002 | Bellinger | 477/111 |
| 6,508,739 B1 * | 1/2003 | Bellinger | 477/62 |
| 6,512,971 B2 * | 1/2003 | Koumura et al. | 701/51 |
| 6,636,795 B1 | 10/2003 | Morscheck | |
| 6,991,583 B2 | 1/2006 | Saitou et al. | |
| 7,204,781 B2 | 4/2007 | Hiraku et al. | |
| 2011/0178684 A1 * | 7/2011 | Umemoto et al. | 701/51 |

OTHER PUBLICATIONS

Dragos et al, Control Solutions for Vehicles with Continuously Variable Transmission, IEEE, 2010 11th International Symposium on Computational Intelligence and Informatics, 2010, pp. 157-162.*
Hui et al, Control Strategy of Hydraulic/Electric Synergy System in Heavy Hybrid, Energy Conversion and Management, vol. 52, Iss. 1, Jan. 2011, pp. 668-674.*

* cited by examiner

*Primary Examiner* — Russell Frejd
(74) *Attorney, Agent, or Firm* — Brooks Kushman P.C.

(57) ABSTRACT

A method for determining a driveline ratio for a powertrain having an auxiliary transmission is provided and includes identifying a transmission gear ratio, measuring a transmission output speed, and measuring an auxiliary transmission output speed. An auxiliary transmission gear ratio is identified by comparing the transmission output speed to the auxiliary transmission output speed when the powertrain is in motion. The auxiliary transmission gear ratio is identified from a switch when the powertrain is at rest. An auxiliary transmission module has an auxiliary transmission in communication with a controller. The controller is configured to identify an auxiliary transmission gear ratio, and limit an engine torque command to limit the auxiliary transmission output torque. The engine torque command is limited if the output torque exceeds a predetermined value and if the auxiliary transmission is in a reducing gear ratio.

20 Claims, 3 Drawing Sheets

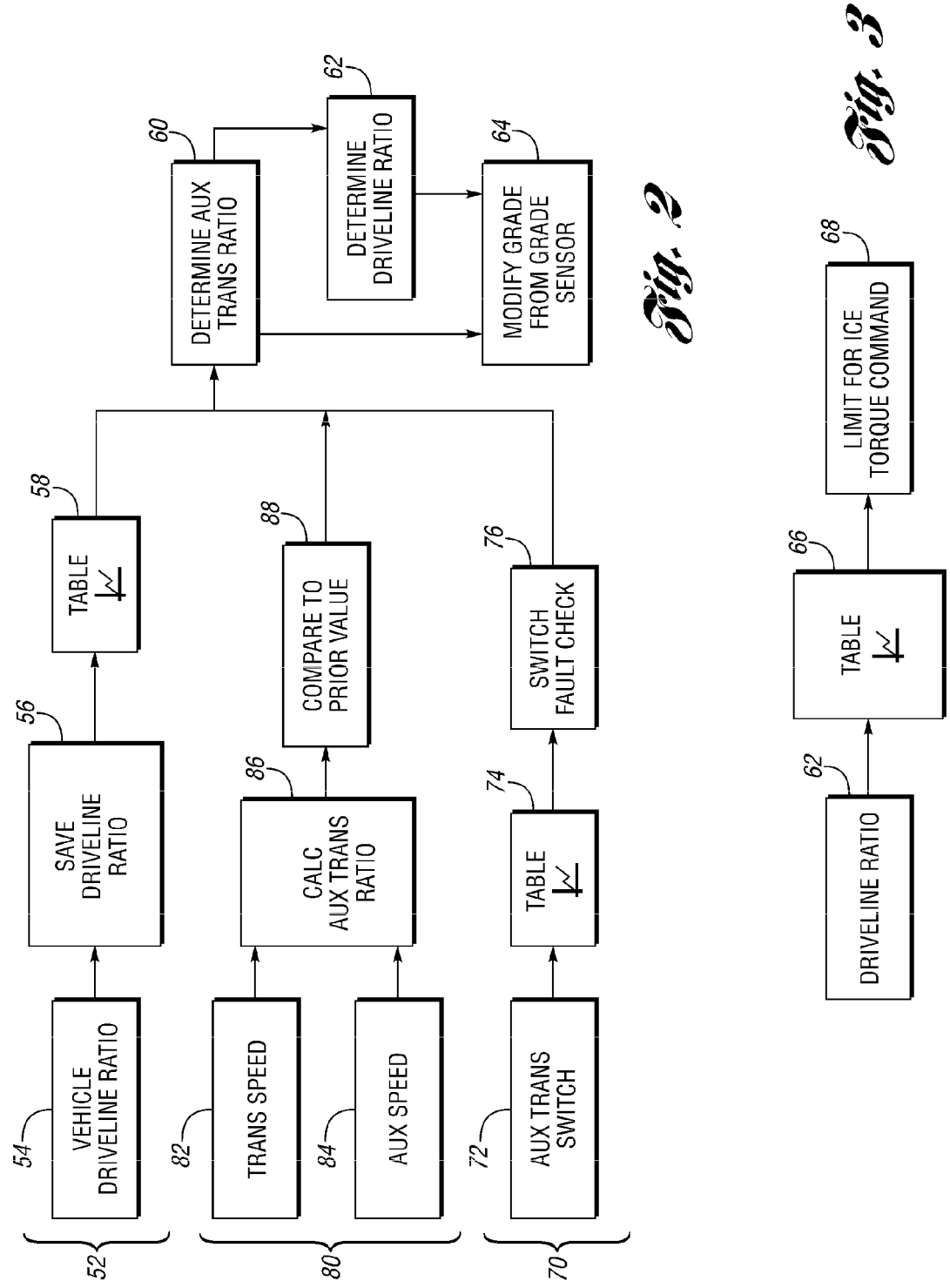

METHOD AND SYSTEM FOR DETERMINING A DRIVELINE RATIO FOR A POWERTRAIN HAVING AN AUXILIARY TRANSMISSION

TECHNICAL FIELD

Various embodiments of this disclosure relate to a method and a system for determining a driveline ratio for a powertrain having an auxiliary transmission, and limiting a torque output of the powertrain.

BACKGROUND

Trucks and other heavy and medium duty capacity vehicles require a heavy duty or medium duty transmission in the powertrain. The powertrain may include an auxiliary transmission connected to the transmission in order to provide sufficient gearing for a vehicle for additional gear reduction for in powertrain. The user is required to estimate the extent of the torque limiting while using an auxiliary transmission in reduction mode. Reduced drivability or damage to the driveline components may result if the torque nears or exceeds the driveline limits while the auxiliary transmission is in a reducing gear.

An automatic transmission that uses a fixed driveline ratio may lead to poor launch and shift performance when used with an auxiliary transmission.

SUMMARY

One disclosed embodiment provides a method for torque limiting of a powertrain having an auxiliary transmission. A gear ratio of a transmission is identified. A gear ratio of the auxiliary transmission is identified. A torque command to an engine is limited to limit torque output from the powertrain. The torque command is limited if the torque output exceeds a predetermined value and if the auxiliary transmission is in a reducing gear ratio.

Another embodiment provides an auxiliary transmission module having an auxiliary transmission and a controller in communication with the auxiliary transmission. The controller is configured to (i) identify a gear ratio of the auxiliary transmission, and (ii) limit a torque command to an engine to limit output torque from the auxiliary transmission. The torque command is limited if the output torque exceeds a predetermined value and if the auxiliary transmission is in a reducing gear ratio.

Yet another embodiment provides a method for determining a driveline ratio for a powertrain with an auxiliary transmission. A gear ratio of a transmission is identified. An output speed of the transmission is measured. An output speed of an auxiliary transmission is measured. A gear ratio of an auxiliary transmission is identified by comparing the output speed of the transmission to the output speed of the auxiliary transmission when the powertrain is in motion. A gear ratio of the auxiliary transmission is identified from a switch on the auxiliary transmission when the powertrain is at rest.

The above aspects of the disclosure and other aspects are described below with reference to the attached drawings.

BRIEF DESCRIPTION OF THE DRAWINGS

FIG. 2 is a process diagram for determining the driveline ratio of the vehicle of FIG. 1;

FIG. 3 is a process diagram for determining a engine torque command of the vehicle of FIG. 1;

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
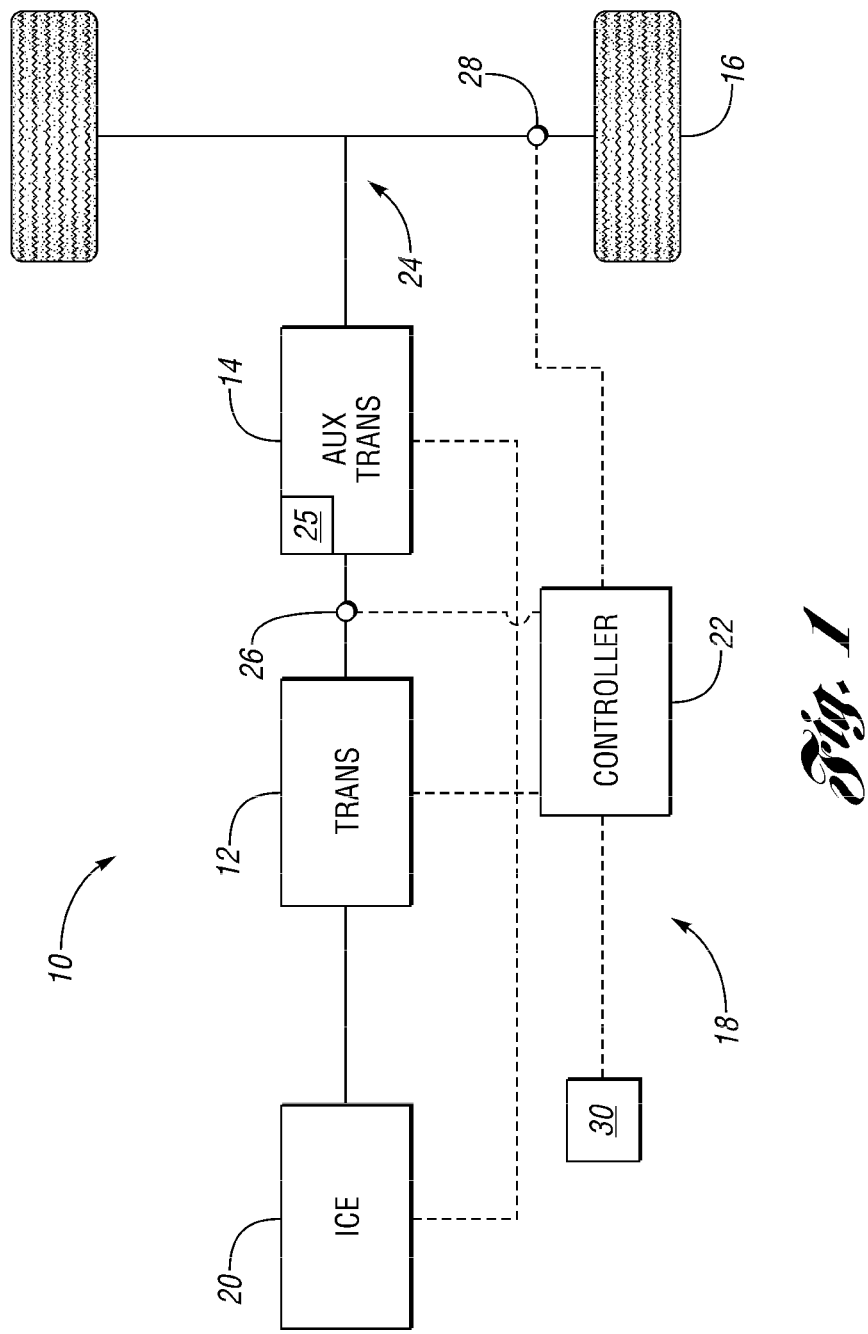
FIG. 1 is a schematic of a powertrain for a vehicle according to an embodiment.

FIG. 1 a schematic of an embodiment of a powertrain 10. The powertrain 10 includes a transmission 12 and an auxiliary transmission 14. The auxiliary transmission 14 is downstream of the transmission 12 and is connected with driving wheels 16 to propel the vehicle 18. An internal combustion engine 20 provides power and torque to the transmission 12. Additional clutches, torque converters and the like may be used to connect the engine 20, transmission 12, auxiliary transmission 14, and the wheels 16. The engine 20, transmission 12, and auxiliary transmission 14 are in communication with a controller 22. The auxiliary transmission 14 is connected to the wheels 16 through a driveline 24, which may include shafts to transmit torque, axles, differentials, and the like.

In one embodiment, the transmission 12 is an automatic transmission. The transmission 12 may be a commercial or industrial grade transmission for medium or heavy duty use. For example, the transmission 12 may be a heavy duty automatic transmission with 18 gear ratios. Of course, the transmission 12 may have any number of gear ratios. Alternatively, the transmission 12 may be a semi-automatic or other manual transmission that are known in the art. The gear ratio of the transmission 12 is identified using a speed differential across the transmission 12, i.e. from an engine output speed and a transmission output speed measurement, from the pressure signals from the various internal clutches to the transmission, or otherwise as is known in the art. Alternatively, the gear ratio of the transmission 12 is identified from a combination of hall effect speed sensing of gear rotation plus position indicators on the shift lever device.

The auxiliary transmission 14 provides additional gear reduction for the powertrain 10 as needed. In one embodiment, the auxiliary transmission 14 is a two speed transmission, having a direct drive and one reducing gear ratio. The reducing gear ratio may be 2:1, or some other ratio as desired for use with the powertrain 10 and the vehicle 18. In another embodiment, the auxiliary transmission 14 is a four speed transmission, having a direct drive and three different reducing gear and/or overdrive ratios. Various speed auxiliary transmissions 14 and various gear ratios may be provided in alternative drivelines. In some embodiments, the auxiliary transmission 14 may also have a power take off. The auxiliary transmission 14 provides a torque to the driveline 24 that is connected to the driving wheels 16. The gear ratio of the auxiliary transmission 14 may be determined by a switch 25, such as a mechanical ball switch, a pneumatic sensor, or the like.

The auxiliary transmission 14 is a gear ratio changing device, such as a gearbox. In other embodiments, the auxiliary transmission 14 may be replaced by a two-speed axle, a planetary hub, or the like.

The driveline ratio is the gear ratio across both the transmission 12 and the auxiliary transmission 14, or in other words, is the combined gear ratio for the powertrain 10.

In some embodiments, the transmission 12 is an automatic transmission that is shifted by the controller 22. The auxiliary transmission may be manually shifted by the user or shifted by the controller 22.

The engine 20 may be an internal combustion engine such as a diesel engine, a gasoline engine, or an alternative fuel engine. The engine 20 may be replaced with another power source, such as a combination of engines, electric machines, fuel cells, or the like, for use as a hybrid system.

The controller 22 may include any number of controllers or may be integrated into a single controller. Some or all of the controllers may be connected by a controller area network (CAN) or other system. The controller 22 controls the transmission 12 and auxiliary transmission 14 to operate on a shift schedule, such as a production shift schedule, that connects and disconnects elements within the gear box to control the ratio between the transmission outputs and transmission inputs.

A speed sensor 26 may be located on an output shaft of the transmission 12, or on an input shaft to the auxiliary transmission 14. The speed sensor 26 is configured to measure the rotational speed of the shaft and send a signal to the controller 22. The speed sensor 26 is used to determine a shaft speed downstream of the transmission 12 and upstream of the auxiliary transmission 14.

Another speed sensor 28 may be located at the wheels, on the driveline 24, or on an output shaft of the auxiliary transmission 14. The speed sensor 28 is configured to measure the rotational speed downstream of the auxiliary transmission 14 and send a signal to the controller 22. The output speed of the engine 20 may also be provided to the controller 22 for use in determining the transmission 12 gear ratio and for controlling the shift points of the transmission 12.

For example, the driveline 24 may be rated to 17,500 lb-ft of torque, which is the upper limit of torque to the driveline 24 to the wheel 16 axle regardless of the driveline gear ratio, and the auxiliary transmission gear ratio. A super heavy driveline may be rated to 22,500 lb-ft of torque to the driveline, regardless of the driveline gear ratio. The torque rating of the driveline 24 may be selected using a service program that connects to the controller 22 to select the driveline 24 type, set other configurations for the vehicle 18, read service codes, or the like. For example, if an auxiliary transmission 14 is present in the powertrain 10, the service program may permit a program user to select the type of auxiliary transmission 14, i.e. two speed, four speed, gear ratios, etc., and select the driveline type, i.e. heavy duty, super heavy duty, etc.

The controller 22 is able to determine, based upon the driveline gear ratio, the shift points for the transmission 12, set threshold speeds and rate limits, control the auxiliary transmission 14 to one of its various gearing states. The controller may also determine if any failed switches are present, and select the appropriate sensors to determine the driveline ratio, i.e. switches, speed sensors, etc. By accurately determining the driveline ratio, the controller 22 improves the shifting of the powertrain 10 by selecting better shift points and preventing skipped gears, etc.

Backlash in the gearing in the transmission 12 and auxiliary transmission 14 may affect the speeds of the output shafts and the driveline 24. Dynamic sensing provides improved and more accurate driveline ratio selection compared to a conventional switch when the vehicle 18 is in motion.

The controller 22 is configured to determine the driveline ratio of the powertrain 10 under various conditions, including start up, launch, and while the vehicle is in motion. The driveline ratio is the gearing ratio across the powertrain 10 (the transmission 12 and the auxiliary transmission 14) that drives the drivetrain 24. The torque and power output from the engine 20 is transmitted to the driveline 24 through the powertrain 10 and is multiplied by the driveline ratio.

A grade sensor 30 may be mounted to the vehicle 18 in communication with the controller 22. The grade sensor 30 may be an accelerometer that is compensated by the driveline ratio to provide grade information. The grade sensor 30 requires an accurate driveline ratio to provide for accurate grade sensing. The gear ratio of the auxiliary transmission 14 is used to adjust the grade sensor 30 acceleration measurements because the driveline gear ratio depends on the auxiliary transmission 14 gear ratio. If the auxiliary transmission 14 gear ratio is changed, the driveline ratio also changes. Acceleration measured by the grade sensor is affected by this change in driveline ratio, and the controller 22 adjusts the grade calculation from the acceleration measured by the sensor 30.

A schematic, as shown in FIG. 2, illustrates the various methods the controller 22 uses to determine the driveline ratio.

The controller 22 uses a previously stored auxiliary transmission 14 gear ratio, as shown through path 52, when the vehicle 18 is initially powered up. The controller 22 saves the vehicle driveline ratio 54 as a powerdown ratio at 56 during a vehicle 18 shutdown event, or periodically as the vehicle 18 is being operated. The controller 22 saves the powerdown ratio with the auxiliary transmission is in direct drive (1:1 gear ratio). The controller may then determine the auxiliary transmission gear ratio 60 using a calibration table 58.

The vehicle driveline ratio 54 is determined by the controller 22 and may be calculated as the gear ratio from the engine 20 out to the tires of the wheels 16 of the vehicle 18. The driveline ratio is stored at vehicle shutdown or periodically as the vehicle is being operated. In one embodiment, the driveline ratio is stored when the auxiliary transmission 14 is in direct drive, or a 1:1 ratio. In other embodiments, the driveline ratio is stored when it falls within a valid range and when the auxiliary transmission 14 is in a direct drive gear ratio.

A calibration table 58 of predetermined gearing ratios, along with known specifications about the transmission 12 and auxiliary transmission 14, is used to determine the auxiliary transmission 14 gear ratio from the powerdown driveline ratio 56 at vehicle start up or launch. The stored powerdown ratio 58 is referenced at vehicle start up to determine the auxiliary transmission ratio 60. At launch, the auxiliary transmission ratio 60 is combined with the transmission 12 gear ratio for use in determining the vehicle driveline ratio 62.

When the vehicle 18 is at a slow speed or at rest while operating, as shown through path 70, the controller 22 uses switch 25 on the auxiliary transmission 14 to determine the auxiliary transmission ratio 60. The switch 25 sends a signal to the controller 22 with data regarding the position of the switch 25 as shown by 72. The controller 22 uses the switch 25 signal with a predetermined calibration table at 74 to determine the auxiliary transmission 14 ratio. Multiple switches may be used to determine the ratio of the auxiliary transmission 14, for example, if a four speed auxiliary transmission 14 is used with the powertrain 10.

The path 70 includes a fault check 76. If there are no faults, the switch 25 will determine the ratio 60. If the switch 25 has a fault, the controller 22 defaults to an unknown auxiliary transmission 14 state, and assumes the auxiliary transmission 14 to be in direct drive, or another ratio that is preprogrammed into the controller 22. Alternatively, if there is a fault, the controller 22 may refer to a stored driveline ratio, such as a powerdown ratio at 58. The controller 22 takes the auxiliary transmission 14 ratio, as determined by the switch or as determined if the switch has faulted, and calculates the driveline ratio at 62 using the current transmission 12 gear ratio.

The controller 22 uses data from the speed sensors 26, 28 to calculate the auxiliary transmission 14 ratio, as shown by path 80, when the vehicle 18 is moving and is at a sufficient speed to obtain accurate signals from the speed sensors 26, 28.

The controller 22 receives a signal from the speed sensor 26 between the transmission 12 and the auxiliary transmission 14 at 82. The controller 22 also receives a signal from the speed sensor 28 downstream of the auxiliary transmission 14 at 84. The controller 22 calculates the gear ratio of the auxiliary transmission by calculating a ratio of the speeds from the respective speed sensors 26, 28 at 86. For example, if the speeds from each of the sensors 26, 28 are the same or approximately the same, the auxiliary transmission 14 is in direct drive. If the speeds from the speed sensors 26, 28 are different and approximately match a predetermined value, the auxiliary transmission may be in a gear reduction state, for example, a 2:1 gear reducing ratio. The ratio may be approximately the same as a predetermined value for a gear ratio due to backlash in the gearing and tolerances. For example, if the ratio as calculated by the controller 22 is within 10% of a predetermined ratio, the auxiliary transmission 14 may be considered to be in the gear ratio associated with that predetermined value.

The controller 22 compares the speed ratio measured at a present time, to a speed ratio measured at a previous time at 88. If these are the same, or approximately the same, value, the controller 22 uses the present time speed ratio for the auxiliary transmission 14 gear ratio at 60. The controller 22 does not update the auxiliary transmission ratio 60 if the speed ratio is rapidly changing over time, as this is likely during a shift event. The time intervals between a present time and previous time measurement may be on the order of milliseconds.

The controller 22 is configured to provide a torque command to limit the engine 20 torque output. By limiting the engine 20 torque output, the torque at the driveline 24 is also limited. The ability of the controller 22 to accurately and dynamically determine the present driveline ratio of the powertrain 10 provides better control over limiting the torque from the engine 20 to the driveline 24 to protect the driveline 24. The controller 22 may also better determine shift points for the transmission 12 based upon the more accurate and dynamic driveline ratio.

The controller 22 may be configured to limit the torque to the driveline 24 based on a number of factors, including: a torque limit for the driveline 24, an engine 20 torque limit, a transmission 12 torque limit during shifting for shift quality, and the like. The controller 22 uses the lowest torque limiter from the various factors for determining the engine 20 torque limit command.

Referring to FIG. 3, the driveline gear ratio may be high enough that the engine 20 torque output, when multiplied by the driveline gear ratio, would lead to a torque in the driveline 24 which exceeds a driveline 24 upper torque limit. The controller 22 uses the algorithm, as shown in FIG. 2, to determine the driveline ratio 62. Then the controller 22 uses the driveline ratio 62 and a calibration table 66 to determine an upper torque limit command 68 for the engine 20. By providing a torque limit command 68 to the engine 20 that limits the torque output of the engine 20, the torque to the driveline 24 is also limited. The calibration table 66 contains predetermined values which correlate the driveline ratio 62 and an engine torque output to a torque at the driveline 24. The controller 22 may then determine a maximum engine torque output for a given driveline ratio and driveline torque limit.

Referring back to FIG. 2, the grade provided through the acceleration measured by the grade sensor 30 may be modified at 64. The grade calculated by the controller 22 is modified to include the auxiliary transmission ratio 60 gear ratio. The grade sensor 30 data relies on the accuracy of the driveline ratio 62 to provide accurate acceleration compensation for determining the grade that the vehicle 18 is traveling over. The grade sensor acceleration compensation algorithm 64 uses the driveline ratio saved at 56 when the vehicle is at rest. The grade sensor acceleration compensation algorithm 64 uses the auxiliary transmission ratio 60 as determined through path 80 and the speed ratio at 86 to modify the vehicle limits and thresholds to determine the grade when the auxiliary transmission 14 is in a reducing gear. For example, the grade sensor acceleration compensation algorithm 64 causes the controller 22 to change to a speed mode sooner while in overdrive mode, etc.

The service program interfaces with the controller 22 allow a user to input information regarding the powertrain 10 and driveline 24 configurations during a service event. For example, the service program permits the user to input whether an auxiliary transmission 14 is present and the type of auxiliary transmission 14 that is installed. Information regarding the number of gears in the auxiliary transmission 14 and the respective gear ratios may be selected or saved to the controller 22, for example, for use in the database for driveline ratios in 56, 74.

The service program also permits the user to input the type of driveline 24 installed in the vehicle 18, such as a medium duty, heavy duty, super heavy duty, or the like. With each driveline 24 configuration, there is a corresponding upper torque limit. In one example, the torque limit for a heavy duty driveline is 17,500 lb-ft, and the torque limit for a super heavy duty driveline is 22,500 lb-ft. Of course, other duty drivelines, and various torque limits may be provided in the vehicle 18.

The controller 22 accesses the information selected through the service program, or uses default information in the controller 22 regarding the auxiliary transmission 14 and the driveline 24 specifications to determine the upper torque limit for the driveline 24.

The controller 22 uses the driveline ratio and the upper torque limit of the driveline 24 to determine an engine torque limiting command. The controller 22 limits the engine 20 torque output such that torque transmitted through the powertrain 10 to the driveline 24 does not exceed the torque limit for the driveline 24.

Figure 4:
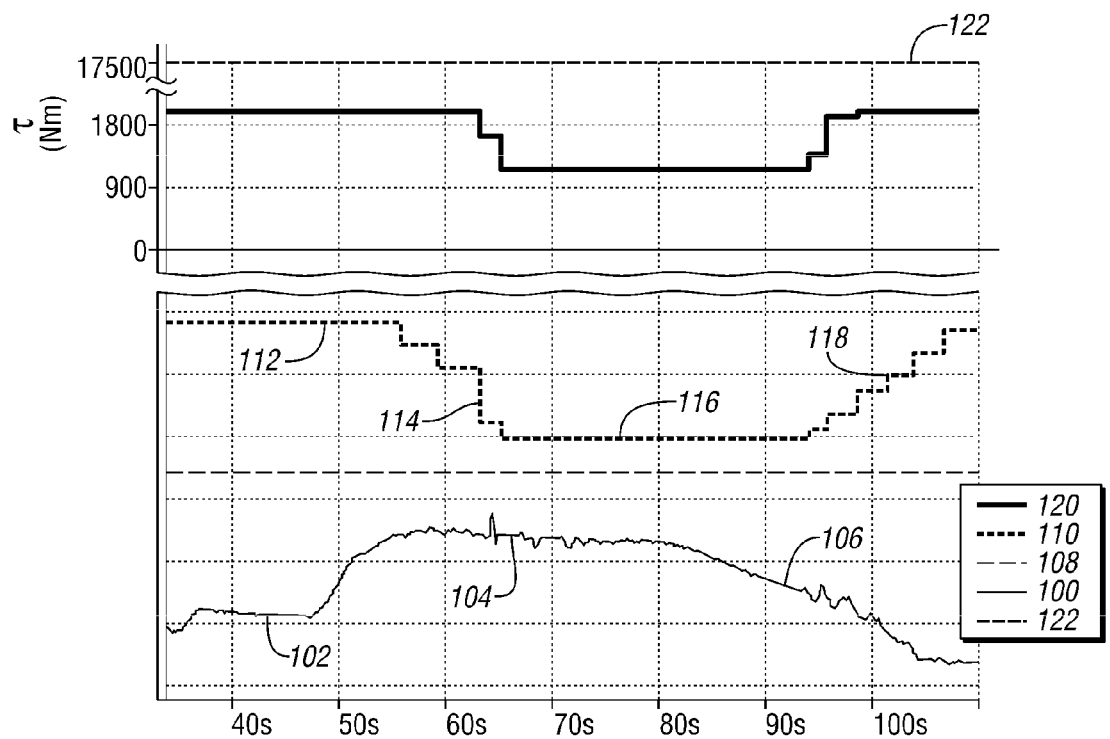
FIG. 4 is a graph of an example of a driveline event for the vehicle of FIG. 1 with torque limiting and the auxiliary transmission in a reducing gear.

FIG. 4 is a graph showing an example of signals to/from the controller 22 during a gear reducing event when the auxiliary transmission 14 is in a reducing gear. The vehicle 18 is traversing a hill having a maximum grade of 15% as shown by line 100. In this example, the engine 20 is at full throttle to provide power for the vehicle 18 as it approaches and goes over a steep graded hill. The vehicle 18 approaches the hill at 102, travels the maximum grade portion of the hill at 104, and travels over a lower grade portion of the hill at 106.

The grade is determined using the grade accelerometer sensor 30. Noise in the signal may be caused by noise, vibration, and harshness (NVH) in the vehicle 18. The auxiliary transmission 14 is in a reduced gear, for the hill event, as shown by line 108. As shown in FIG. 4, the auxiliary transmission is in a 2:1 reducing gear ratio, although other gear ratios may be provided.

The transmission 12 ratio is shown at 110. The transmission 12 is initially in overdrive, or $18^{th}$ gear at 112. As the grade increases, the controller downshifts the transmission 12 several times, as shown at 114. The controller 22 downshifts the transmission 12 to $3^{rd}$ gear at 116 over the maximum grade portion 104 of the hill. As the vehicle begins to travel over a lower grade section of the hill, at 106, the controller 22 upshifts the transmission 12 as shown at 118.

The controller 22 uses the speed ratio from sensors 26, 28 to determine whether the auxiliary transmission 14 is in a reducing gear ratio. The controller 22 determines the gear ratio of the transmission 12 and then calculates the driveline ratio. The controller 22 uses the driveline ratio and a table of predetermined values to determine an engine upper torque limit. The controller 22 provides a torque limiting command to the engine 20 to limit the engine torque output based on the driveline ratio. Alternatively, the controller 22 may clip an engine torque command such that does not exceed the limit determined by the controller 22.

The engine 20 torque command is shown by line 120, that provides an upper limit for the engine torque output. When the vehicle 18 is going over a hill, the engine 20 may be operating at wide open throttle at maximum torque and power available. The controller 22 may need to limit the engine torque command in this scenario as the load on the engine is high and the powertrain is downshifting. The torque limiting of the engine 20 limits the driveline 24 torque at the wheels 16, shown at 122, to its upper limit, for example, 17,500 lb-ft.

The controller 22 calculates a different driveline ratio and engine torque limit as the transmission 12 downshifts, and changes the torque command to the engine 20 so that the driveline torque does not exceed its limit 122. Without a torque limiting command to the engine 20, the driveline 24 torque increases as the transmission 14 is downshifted.

As illustrated in FIG. 3, the transmission 14 is an automatic transmission, and the controller 22 determines the shift points for the transmission 12 to smoothly shift the transmission 12 to meet the changing grade condition 100.

Figure 5:
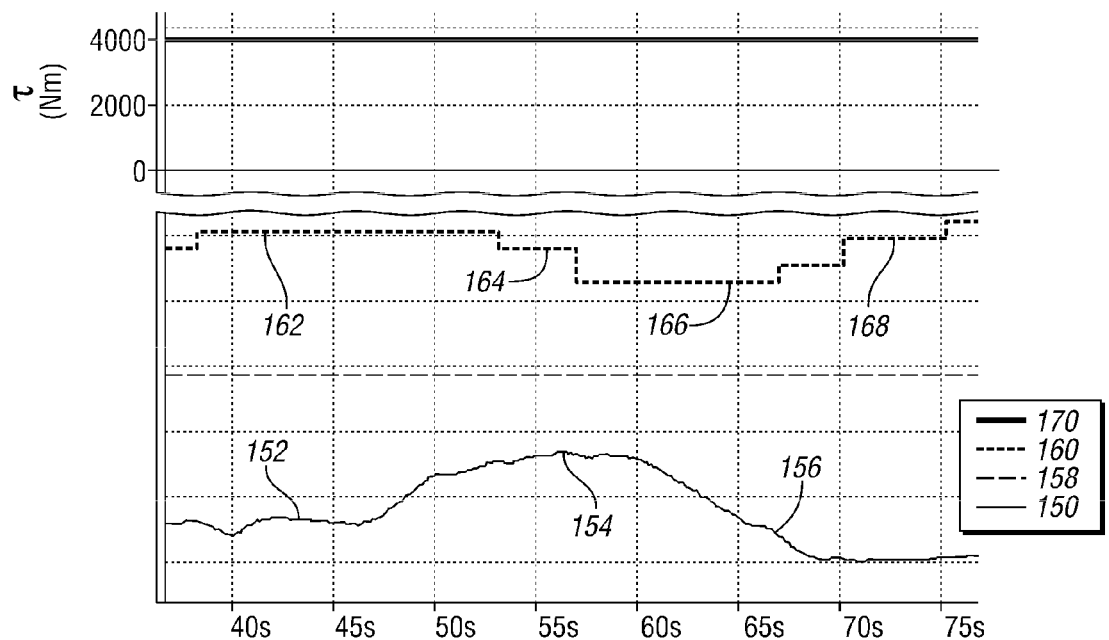
FIG. 5 is a graph of an example of a driveline event for the vehicle of FIG. 1 without torque limiting and the auxiliary transmission in direct drive.

FIG. 5 illustrates a graph showing the signals to/from the controller 22 during a gear reducing event when the auxiliary transmission 14 is in direct drive, or a 1:1 gear ratio. The vehicle 18 is traversing a hill having a maximum grade of 16% as shown by line 150. In this example, the engine 20 may be at wide open throttle as the vehicle 18 approaches and goes over a steep graded hill. The vehicle approaches the hill at 152, travels the maximum grade portion of the hill at 154, and then goes downhill or over a reduced grade portion at 156.

The grade is determined using the grade accelerometer sensor 30. Noise in the signal may be caused by NVH in the vehicle 18. The auxiliary transmission 14 is in direct drive, where there is no gear reduction, as shown by line 158. Torque is therefore directly transmitted through the auxiliary transmission 14 without a multiplying effect.

The transmission 12 gear ratio is shown at 160. The transmission is initially in $13^{th}$ gear at 162. As the grade increases, the controller 22 downshifts the transmission 12 several times, as shown at 164. The controller 22 downshifts the transmission 12 to $9^{th}$ gear at 166 at the maximum grade of the hill. As the vehicle 18 begins to descend, or the grade lessens, the controller 22 upshifts the transmission 12, as shown at 168. The controller 22 uses the speed ratio from speed sensors 26, 28 to determine whether the auxiliary transmission 14 gear ratio is in direct drive. The controller 22 determines the gear ratio of the transmission 12 and calculates the driveline ratio. The controller uses the driveline ratio and a predetermined calibration table to provide a torque command to the engine 20 so that the driveline 24 torque does not exceed the driveline torque limit.

The engine 20 torque command is shown by line 170. Since the auxiliary transmission 14 is in direct drive, the controller 22 does not need to limit the engine 20 torque command. In this scenario, with the auxiliary transmission 14 is in direct drive, the torque at the driveline 24 does not approach its upper limit. The torque in the driveline 24 is below its upper limit with the engine 20 at maximum torque output, the transmission 12 is in a reduced gear, and the auxiliary transmission 14 is in direct drive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for torque limiting a powertrain having an auxiliary transmission, the method comprising:
   identifying a gear ratio of a transmission;
   identifying a gear ratio of an auxiliary transmission positioned downstream of the transmission; and
   limiting a torque command to an engine to limit a torque output from the auxiliary transmission, the torque output determined using the transmission gear ratio and the auxiliary transmission gear ratio, wherein the torque command is limited if the torque output exceeds a predetermined value and if the auxiliary transmission is in a reducing gear ratio.

2. The method of claim 1 wherein the gear ratio of the auxiliary transmission is identified by determining a speed ratio of an output speed of the transmission and an output speed of the auxiliary transmission when the powertrain is in motion.

3. The method of claim 2 wherein the output speed of the auxiliary transmission is determined from a wheel speed sensor.

4. The method of claim 1 wherein the gear ratio of the auxiliary transmission is determined from a stored previous state of a driveline ratio.

5. The method of claim 1 further comprising modifying a grade measured by an acceleration sensor to compensate for a change in a driveline ratio caused by a change in the gear ratio of the auxiliary transmission.

6. The method of claim 1 further comprising inputting an auxiliary transmission specification to a controller to provide the predetermined value.

7. The method of claim 1 further comprising inputting a torque capacity specification of a driveline to a controller to provide the predetermined value.

8. The method of claim 1 wherein the gear ratio of the auxiliary transmission is determined using a switch in the auxiliary transmission when the powertrain is at rest.

9. An auxiliary transmission module comprising:
   an auxiliary transmission; and
   a controller in communication with the auxiliary transmission and configured to (i) identify a gear ratio of the auxiliary transmission, and (ii) limit a torque command to an engine to limit output torque from the auxiliary transmission, wherein the torque command is limited if the output torque exceeds a predetermined value and if the auxiliary transmission is in a reducing gear ratio.

10. The auxiliary transmission module of claim 9 further comprising:
    a first speed sensor upstream of the auxiliary transmission; and
    a second speed sensor downstream of the auxiliary transmission;
    wherein the controller is configured to determine a speed ratio from the first and second speed sensors to determine the gear ratio of the auxiliary transmission.

11. The auxiliary transmission module of claim 10 wherein the first speed sensor is configured to measure the rotational speed of an input shaft to the auxiliary transmission.

12. The auxiliary transmission module of claim 10 wherein the second speed sensor is configured to measure the rotational speed of a wheel.

13. The auxiliary transmission module of claim 10 wherein the second speed sensor is configured to measure the rotational speed of an output shaft of the auxiliary transmission.

14. The auxiliary transmission module of claim 9 wherein the auxiliary transmission is a two speed transmission.

15. The auxiliary transmission module of claim 9 wherein the auxiliary transmission has a switch, the switch providing the gear ratio of the auxiliary transmission when the auxiliary transmission is at rest.

16. A powertrain comprising:
    an automatic transmission; and
    the auxiliary transmission module of claim 9;
    wherein the controller is configured to identify a gear ratio of the automatic transmission for use in limiting the torque to the wheel.

17. A method for determining a driveline ratio for a powertrain having an auxiliary transmission, the method comprising:
    identifying a gear ratio of a transmission;
    measuring an output speed of the transmission;
    measuring an output speed of an auxiliary transmission;
    identifying a gear ratio of an auxiliary transmission by comparing the output speed of the transmission to the output speed of the auxiliary transmission when the powertrain is in motion;
    identifying the gear ratio of the auxiliary transmission from a switch on the auxiliary transmission when the powertrain is at rest; and
    calculating a driveline ratio from the gear ratio of the transmission and the gear ratio of the auxiliary transmission.

18. The method of claim 17 wherein the output speed of the auxiliary transmission is measured by a vehicle wheel speed sensor.

19. The method of claim 17 further comprising limiting an engine torque command if a torque to a wheel connected to the powertrain exceeds a predetermined value.

20. The method of claim 17 further comprising determining a shift point of the transmission using the driveline ratio.

* * * * *